United States Patent
Ikkink et al.

(10) Patent No.: US 7,895,002 B2
(45) Date of Patent: Feb. 22, 2011

(54) DEVICE COMPRISING A SENSOR ARRANGEMENT AND AN UPDATER

(75) Inventors: Teunis J. Ikkink, Geldrop (NL); Hans M. B. Boeve, Hechtel-Eksel (BE); Gerjan Van De Walle, Retie (BE)

(73) Assignee: NXP B.V., Eindhoven (NL)

( * ) Notice: Subject to any disclaimer, the term of this patent is extended or adjusted under 35 U.S.C. 154(b) by 109 days.

(21) Appl. No.: 11/913,588

(22) PCT Filed: Apr. 27, 2006

(86) PCT No.: PCT/IB2006/051314
§ 371 (c)(1),
(2), (4) Date: Oct. 6, 2009

(87) PCT Pub. No.: WO2006/117728
PCT Pub. Date: Nov. 9, 2006

(65) Prior Publication Data
US 2010/0017160 A1   Jan. 21, 2010

(30) Foreign Application Priority Data
May 4, 2005   (EP) .................................. 05103742

(51) Int. Cl.
*G01L 1/00* (2006.01)
*G01C 17/00* (2006.01)
*G01R 33/02* (2006.01)
(52) U.S. Cl. .................. 702/41; 33/355 R; 324/246
(58) Field of Classification Search .................. 702/92, 702/33, 38, 41, 57, 69, 81, 84–85, 91, 94–95, 702/104–105, 127, 150–154, 182–183, 189–191, 702/193, 197, 199; 33/1 E, 316, 318–319, 33/324, 356–357, 355 R; 324/202, 219, 324/246–247, 260; 73/1.75–1.77; 701/224
See application file for complete search history.

(56) References Cited

U.S. PATENT DOCUMENTS

| 6,140,933 A | 10/2000 | Bugno et al. |
| 2002/0100178 A1 | 8/2002 | Smith et al. |
| 2004/0172838 A1 | 9/2004 | Satoh et al. |
| 2004/0236510 A1 | 11/2004 | Ockerse et al. |

OTHER PUBLICATIONS

Paperno et al., Three-Dimensional Magnetic Tracking of Biaxial Sensors, May 2004, IEEE Transactions on Magnetics, vol. 40, No. 3, pp. 1530-1536.*

* cited by examiner

*Primary Examiner*—Michael P Nghiem
*Assistant Examiner*—Toan M Le

(57) ABSTRACT

Devices comprising sensor arrangements for providing first field information defining at least parts of first fields and for providing second field information defining at least parts of second fields are provided with updaters for updating parameters of the first and/or second fields via criterion-dependent iterations, to become more reliable and user friendly. The fields may be earth gravitational fields and/or earth magnetic fields and/or further fields. The parameters comprise magnitudes of the fields and dot products of the fields. The criterion-dependent iterations comprise magnitude functions and dot product functions. The magnitude functions define new magnitudes being functions of old magnitudes and of updated magnitudes and the dot product functions define new dot products being functions of old dot products and of updated dot products. The criterion-dependent iterations further comprise one dimensional criteria and/or rectangular, hyperbolic and/or topped-off hyperbolic two dimensional criteria all defining threshold values.

7 Claims, 2 Drawing Sheets

DEVICE COMPRISING A SENSOR ARRANGEMENT AND AN UPDATER

BACKGROUND OF THE INVENTION

1. Field of the Invention

The invention relates to a device comprising a sensor arrangement and an updater, and also relates to an updater, to a method, to a processor program product and to a data carrier.

Examples of such a device are personal computers, electronic compasses, wrist watches, navigation devices, mobile phones, personal digital assistants and other handheld devices. The sensor arrangement for example comprises a magnetometer or a geomagnetic force detector and/or an accelerometer or a tilt angle detector.

2. Description of Related Art

A prior art device is known from US 2004/0172838, which discloses a device with a sensor arrangement comprising a geomagnetic force detector and a tilt angle detector. The geomagnetic force detector provides geomagnetic force information defining a geomagnetic force and the tilt angle detector provides tilt angle information defining a tilt angle. The geomagnetic force detector detects a first axis component and a second axis component of the geomagnetic force, and a geomagnetic force calculator calculates a third axis component of the geomagnetic force based on the geomagnetic force information.

The known device is disadvantageous, inter alia, owing to the fact that it provides information that is reliable to a relatively small extent and/or unreliable to a relatively large extent.

BRIEF SUMMARY OF THE INVENTION

It is an object of the invention, inter alia, to provide a device that provides at least one parameter of at least one of the first and second fields that is reliable to a relatively large extent and/or unreliable to a relatively small extent.

Further objects of the invention are, inter alia, to provide an updater, a method, a processor program product and a data carrier that provide at least one parameter of at least one of the first and second fields that is reliable to a relatively large extent and/or unreliable to a relatively small extent.

The device according to the invention comprises:

a sensor arrangement for providing first field information defining at least a part of a first field and for providing second field information defining at least a part of a second field, and an updater for updating at least a parameter of at least one of the first and second fields via at least one criterion-dependent iteration.

By introducing the updater, the device according to the invention provides at least one parameter of at least one of the first and second fields that is reliable to a relatively large extent and/or unreliable to a relatively small extent. Compared to the prior art calculator (as for example disclosed in paragraphs 0072 and 0116 of US 2004/0172838), which relies on an external infrastructure and information source to obtain these parameters, the updater can update at least one parameter of at least one of the first and second fields via at least one criterion-dependent iteration. In this way the device can operate autonomously, without relying on an external infrastructure or database. Such a criterion-dependent iteration allows a parameter to be updated in a reliable way, and as a result the parameter will be reliable to a relatively large extent and/or unreliable to a relatively small extent.

The device according to the invention is further advantageous, inter alia, in that its reliable parameter can be used for increasing the reliability of the first and second field information. Such more reliable first and second field information increases the user friendliness of the device. The at least one criterion-dependent iteration may for example comprise one or more criterion-dependent iterations, possibly in combination with one or more criterion-independent iterations. A criterion-dependent iteration may depend on one or more criteria.

An embodiment of the device according to the invention is defined by the part of the first field comprising respective first and second components of the first field in respective first and second directions and the part of the second field comprising respective first and second components of the second field in respective first and second directions, and the parameter comprising a magnitude of at least one of the first and second fields and a dot product of the first and second fields. The respective first and second components in respective first and second directions are for example respective first axis and second axis components such as for example x-axis and y-axis components. The magnitude of at least one of the first and second fields and the dot product of the first and second fields are known parameters that, according to an aspect of the invention, can be used advantageously for increasing the reliability of the first and second field information, under the condition that these parameters are reliable themselves.

An embodiment of the device according to the invention is defined by the part of the first field further comprising a third component of the first field in a third direction, and the criterion-dependent iteration comprising a magnitude function and a dot product function. The third component of the first field in the third direction is for example a third axis component such as for example a z-axis component. Other mutually different first and second and third directions are not to be excluded. The magnitude function such as for example a magnitude low pass filter allows the reliability of the magnitude to be increased, and the dot product function such as for example a dot product low pass filter allows the reliability of the dot product to be increased.

An embodiment of the device according to the invention is defined by the magnitude function defining a new magnitude of the second field being a function of an old magnitude of the second field and of an updated magnitude of the second field and the dot product function defining a new dot product of the first and second fields being a function of an old dot product of the first and second fields and of an updated dot product of the first and second fields. For example, in a first-order low pass filter, a new term is equal to a sum of a product of alpha and an updated term and a product of one-minus-alpha and an old term, the term being either the magnitude or the dot product. Alpha should get a value close to the value zero in case of a relatively noisy situation and should get a value close to the value one in case of a relatively noise-free situation.

An embodiment of the device according to the invention is defined by the device further comprising:

an estimator for estimating a third component of the second field in a third direction, the criterion-dependent iteration further comprising at least one criterion defining at least one threshold value for at least one term comprising at least one third component. This embodiment is especially useful in case the first field information defines the entire three dimensional first field and in case the unknown third component of the second field in the third dimension is to be estimated. The threshold value may comprise a first value for the third component of the first field and/or a second value for an estimated magnitude of the third component of the second field and/or a third value for a product of the third component of the first field and the estimated magnitude of the third component of the second field, without excluding further criteria and/or further values.

An embodiment of the device according to the invention is defined by a magnitude of the third component of the second field being related:

either to a square root of a difference between the old magnitude squared of the second field and a sum of the first component squared and the second component squared of the second field in case this difference is larger than zero or to zero in case this difference is equal to or smaller than zero, or to a magnitude of a further difference between the old dot product and a sum of a first product of the first components of the first and second fields and a second product of the second components of the first and second fields, which further difference is divided by a magnitude of the third component of the first field.

The first magnitude estimation shows a proper convergence for two dimensional criteria such as hyperbolic and topped-off hyperbolic criteria. The second magnitude estimation shows a proper convergence for one and two dimensional criteria.

An embodiment of the device according to the invention is defined by the criterion-dependent iteration comprising a first magnitude function and a second magnitude function and a dot product function. The first magnitude function such as for example a first magnitude low pass filter allows the reliability of the first magnitude to be increased, and the second magnitude function such as for example a second magnitude low pass filter allows the reliability of the second magnitude to be increased, and the dot product function such as for example a dot product low pass filter allows the reliability of the dot product to be increased.

An embodiment of the device according to the invention is defined by the first magnitude function defining a new first magnitude of the first field being a function of an old first magnitude of the first field and of an updated first magnitude of the first field and the second magnitude function defining a new second magnitude of the second field being a function of an old second magnitude of the second field and of an updated second magnitude of the second field and the dot product function defining a new dot product of the first and second fields being a function of an old dot product of the first and second fields and of an updated dot product of the first and second fields. For example, in a first-order low pass filter, a new term is equal to a sum of a product of alpha and an updated term and a product of one-minus-alpha and an old term, the term being either the first magnitude or the second magnitude or the dot product. Alpha should get a value close to the value zero in case of a relatively noisy situation and should get a value close to the value one in case of a relatively noise-free situation.

An embodiment of the device according to the invention is defined by the device further comprising:

an estimator for estimating third components of the first and second fields in third directions, the criterion-dependent iteration further comprising at least one criterion defining at least one threshold value for at least one term comprising at least one third component. This embodiment is especially useful in case the first field information defines only a two dimensional part of the three dimensional first field and in case the unknown third components of the first and second field in the third dimension are to be estimated. The threshold value may comprise a first value for an estimated magnitude of the third component of the first field and/or a second value for an estimated magnitude of the third component of the second field and/or a third value for a product of the estimated magnitudes of both third components, without excluding further criteria and/or further values.

An embodiment of the device according to the invention is defined by magnitudes of the third components of the first and second fields being related:

either to, for the first field, a square root of a first difference between the old magnitude squared of this first field and a sum of the first component squared and the second component squared of this first field in case this first difference is larger than zero for this first field or to zero for this first field in case this first difference is equal to or smaller than zero for this first field and to, for the second field, a square root of a second difference between the old magnitude squared of this second field and a sum of the first component squared and the second component squared of this second field in case this second difference is larger than zero for this second field or to zero for this second field in case this second difference is equal to or smaller than zero for this second field, or to, for one of the fields, a square root of a difference between the old magnitude squared of this one field and a sum of the first component squared and the second component squared of this one field in case this difference is larger than zero for this one field or to zero for this one field in case this difference is equal to or smaller than zero for this one field and to, for the other field, a magnitude of a further difference between the old dot product and a sum of a first product of the first components of the first and second fields and a second product of the second components of the first and second fields, which further difference is divided by a magnitude of the third component of the one field.

The first magnitude estimations do not show a proper convergence in general and are only to be used in a rare situation, for example for checking consistency. The second magnitude estimations show a proper convergence for two dimensional criteria such as hyperbolic and topped-off hyperbolic criteria.

Embodiments of the updater according to the invention and of the method according to the invention and of the processor program product according to the invention and of the data carrier according to the invention correspond with the embodiments of the device according to the invention.

The invention is based upon an insight, inter alia, that the prior art calculator relies on an external infrastructure and information source to obtain characteristic parameters of the fields, and is based upon a basic idea, inter alia, that the updater should update at least a parameter of at least one of the first and second fields via at least one criterion-dependent iteration. In this way the device can operate autonomously, without relying on an external infrastructure or database.

The invention solves the problem, inter alia, to provide a device that provides at least one parameter of at least one of the first and second fields that is reliable to a relatively large extent and/or unreliable to a relatively small extent, and is further advantageous, inter alia, in that its reliable parameter can be used for increasing the reliability of the first and second field information. Such more reliable first and second field information increases the user friendliness of the device.

These and other aspects of the invention will be apparent from and elucidated with reference to the embodiment(s) described hereinafter.

DETAILED DESCRIPTION OF THE INVENTION

Figure 1:
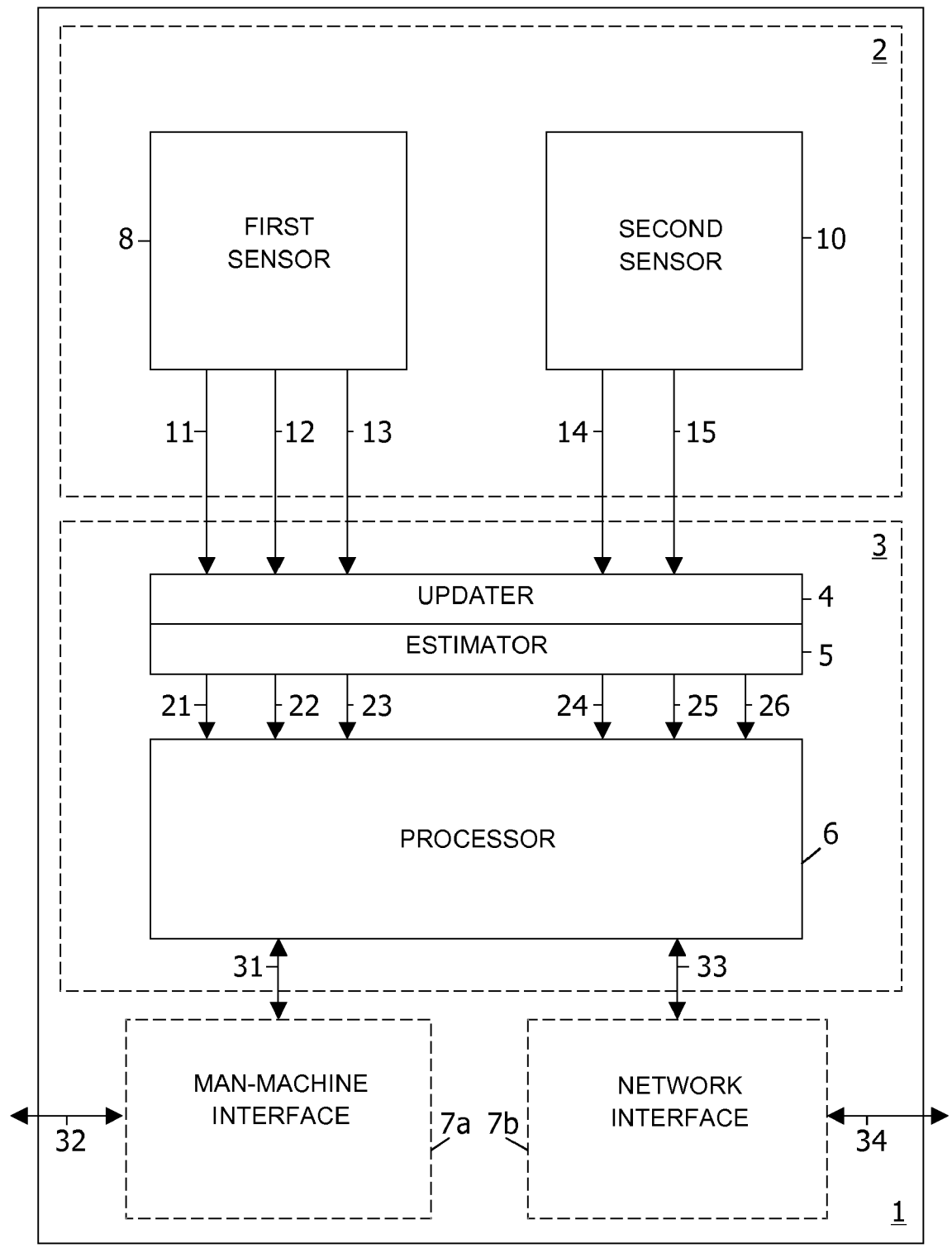
FIG. 1 shows diagrammatically a device according to the invention comprising an updater according to the invention.

The device 1 according to the invention shown in FIG. 1 comprises a sensor arrangement 2 comprising a first sensor 8 for providing first field information defining a first (vector) field and comprising a second sensor 10 for providing second field information defining a part of a second (vector) field. The device 1 further comprises a controller 3 comprising an updater 4 according to the invention for updating at least a parameter of at least one of the first and second (vector) fields and an estimator 5 and a processor 6. The updater 4 is coupled via couplings 11-13 to the first sensor 8 and via couplings 14,15 to the second sensor 10 and is coupled to the estimator 5. The estimator 5 is coupled via couplings 21-26 to the processor 6. The device 1 further comprises a man-machine-interface 7a or mmi 7a coupled to the processor 6 via a coupling 31. The mmi 7a either comprises a display, a keyboard, a loudspeaker and/or a microphone etc. or is to be coupled to a display, a keyboard, a loudspeaker and/or a microphone etc. via a coupling 32. The device 1 further comprises a network interface 7b coupled to the processor 6 via a coupling 33 and to be coupled wiredly or wirelessly to a network not shown here via a coupling 34.

The first sensor 8 provides the first field information defining the first field for example through respective first and second and third components of the first field Ux,Uy,Uz in respective first and second and third directions x,y,z. The second sensor 10 provides the second field information defining the part of the second field for example through respective first and second components of the second field Vx,Vy in respective first and second directions x,y.

According to the invention, the updater 4 updates at least a parameter of at least one of the first and second fields via at least one criterion-dependent iteration. The parameter to be updated by the updater 4 comprises for example a magnitude of at least one of the first and second fields and a dot product of the first and second fields, in equations:

$|U| = (Ux^2 + Uy^2 + Uz^2)^{1/2}$ $|V|\text{updated} = (Vx^2 + Vy^2)^{1/2}$ $(U \cdot V)\text{updated} = UxVx + UyVy$ The criterion-dependent iteration comprises for example a magnitude function such as for example a magnitude low pass filter and a dot product function such as for example a dot product low pass filter. This magnitude function defines for example a new magnitude of the second field being a function of an old magnitude of the second field and of an updated magnitude of the second field and the dot product function for example defines a new dot product of the first and second fields being a function of an old dot product of the first and second fields and of an updated dot product of the first and second fields, in equations:

$|V|\text{new} = (1-\alpha)|V|\text{old} + \alpha|V|\text{updated}$ $(U \cdot V)\text{new} = (1-\alpha)(U \cdot V)\text{old} + \alpha(U \cdot V)\text{updated}$ The bandwidth-determining coefficient $\alpha$ should get a value close to the value zero in case of a relatively noisy situation and should get a value close to the value one in case of a relatively noise-free situation. Further coefficients are not to be excluded.

The estimator 5 estimates for example a magnitude of a third component of the second field Vz in a third direction. The criterion-dependent iteration further comprises for example at least one criterion defining at least one threshold value for at least one term comprising at least one third component, in equations:

$|Vz|\text{estimated} < \epsilon_1$ (one dimensional criterion)

$|Vz|\text{estimated} < \epsilon_1 \,\&\, |Uz| < \epsilon_2$ (rectangular two dimensional criterion)

$|Uz| \cdot |Vz|\text{estimated} < \epsilon_3^2$ (hyperbolic two dimensional criterion)

$|Uz| \cdot |Vz|\text{estimated} < \epsilon_3^2 \,\&\, |Vz|\text{estimated} < \epsilon_4 \,\&\, |Uz| < \epsilon_5$ (topped-off hyperbolic two dimensional criterion)

Further criteria are not to be excluded.

The magnitude of the third component of the second field $|Vz|\text{estimated}-1$ is for example related to a square root of a difference between the old magnitude squared of the second field and a sum of the first component squared and the second component squared of the second field in case this difference is larger than zero or to zero in case this difference is equal to or smaller than zero. Alternatively, the magnitude of the third component of the second field $|Vz|\text{estimated}-2$ is for example related to a magnitude of a further difference between the old dot product and a sum of a first product of the first components of the first and second fields and a second product of the second components of the first and second fields, which further difference is divided by a magnitude of the third component of the first field, in equations:

$$|Vz|\text{estimated} - 1 = (|V|\text{old}^2 - Vx^2 - Vy^2)^{\frac{1}{2}}$$
$$\text{if } |V|\text{old}^2 - Vx^2 - Vy^2 > 0$$
$$= 0 \text{ elsewhere.}$$

$$|Vz|\text{estimated} - 2 = |(U \cdot V - UxVx - UyVy)| / |Uz|$$

In view of FIG. 1, the first sensor 8 supplies a signal Ux via the coupling 11, a signal Uy via the coupling 12 and a signal Uz via the coupling 13. The second sensor 10 supplies a signal Vx via the coupling 14 and a signal Vy via the coupling 15. The updater 4 updates |V| and (U·V) iteratively as long as the selected criteria are fulfilled. The estimator 5 calculates |Vz|estimated and informs the updater 4 and supplies a signal Ux via the coupling 21, a signal Uy via the coupling 22, a signal Uz via the coupling 23, a signal Vx via the coupling 24, a signal Vy via the coupling 25 and a signal |Vz|estimated-1or2 via the coupling 26. Alternatively, a starting value of |Vz|estimated is not to be estimated but is to be downloaded or is to be entered by hand by a user.

In case of using |Vz|estimated-1, only the hyperbolic and the topped-off hyperbolic criteria can be used. In case of using |Vz|estimated-2, not just the hyperbolic and the topped-off hyperbolic criteria can be used, but also the one dimensional and the rectangular criteria can be used. So, preferably, the estimator 5 has both options available and the updater 4 comprises a detector not shown here for detecting a convergence and comprises a selector not shown here for in response to a detection selecting one of the two options. Alternatively, both options are used in parallel, and the updater 4 comprises a comparator for comparing results of both options with each other and/or with stored data and comprises a selector for in response to a comparison selecting one of the two options. Further alternatively, both options are used in parallel, and the updater 4 comprises a weighting unit for weighting the results of both options. Such a detector, such a selector, such a comparator and such a weighting unit may alternatively form part of the estimator 5 or of the processor 6.

Figure 2:
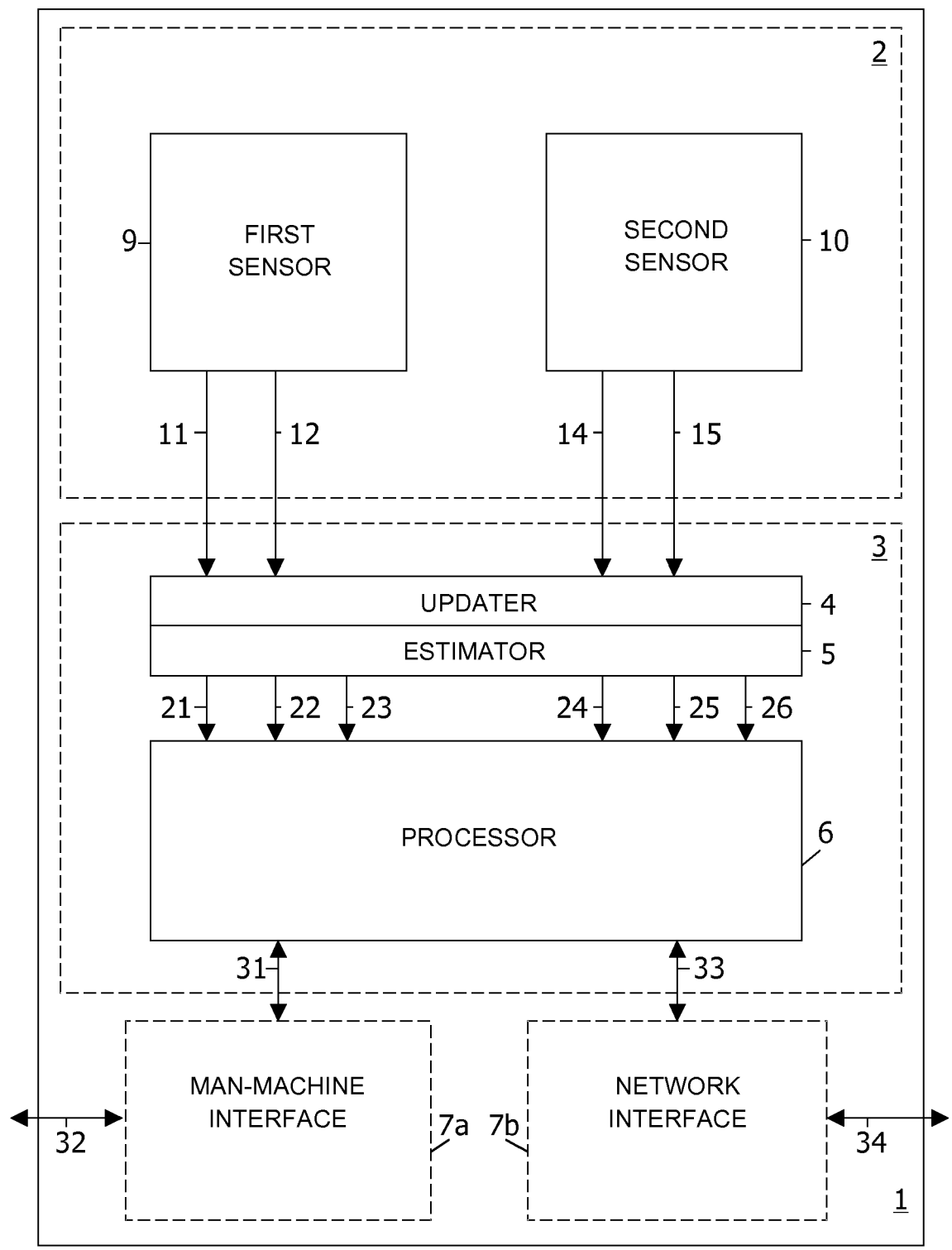
FIG. 2 shows diagrammatically a further device according to the invention comprising a further updater according to the invention.

The device 1 according to the invention shown in FIG. 2 comprises a sensor arrangement 2 comprising a first sensor 9 for providing first field information defining only a part of a first (vector) field (not the entire first (vector) field as for FIG. 1) and comprising a second sensor 10 for providing second field information defining a part of a second (vector) field. The device 1 further comprises a controller 3 comprising an updater 4 according to the invention for updating at least a parameter of at least one of the first and second (vector) fields and an estimator 5 and a processor 6. The updater 4 is coupled via couplings 11-13 to the first sensor 9 and via couplings 14,15 to the second sensor 10 and is coupled to the estimator 5. The estimator 5 is coupled via couplings 21-26 to the processor 6. The device 1 further comprises a man-machine-interface 7a or mmi 7a and a network interface 7b all already discussed for FIG. 1.

The first sensor 9 provides the first field information defining the part of the first field for example through respective first and second components of the first field Ux,Uy in respective first and second directions x,y. The second sensor 10 provides the second field information defining the part of the second field for example through respective first and second components of the second field Vx,Vy in respective first and second directions x,y.

Again according to the invention, the updater 4 updates at least a parameter of at least one of the first and second fields via at least one criterion-dependent iteration. The parameter to be updated by the updater 4 comprises for example a magnitude of at least one of the first and second fields and a dot product of the first and second fields, in equations:

$$|U|\text{updated} = (Ux^2 + Uy^2)^{1/2}$$

$$|V|\text{updated} = (Vx^2 + Vy^2)^{1/2}$$

$$(U \cdot V)\text{updated} = UxVx + UyVy$$

The criterion-dependent iteration comprises for example a first magnitude function such as for example a first magnitude low pass filter and a second magnitude function such as for example a second magnitude low pass filter and a dot product function such as for example a dot product low pass filter. This first (second) magnitude function defines for example a new first (second) magnitude of the first (second) field being a function of an old first (second) magnitude of the first (second) field and of an updated first (second) magnitude of the first (second) field and the dot product function for example defines a new dot product of the first and second fields being a function of an old dot product of the first and second fields and of an updated dot product of the first and second fields, in equations:

$$|U|\text{new} = (1-\alpha)|U|\text{old} + \alpha|U|\text{updated}$$

$$|V|\text{new} = (1-\alpha)|V|\text{old} + \alpha|V|\text{updated}$$

$$(U \cdot V)\text{new} = (1-\alpha)(U \cdot V)\text{old} + \alpha(U \cdot V)\text{updated}$$

The bandwidth-determining coefficient $\alpha$ should get a value close to the value zero in case of a relatively noisy situation and should get a value close to the value one in case of a relatively noise-free situation. Further coefficients are not to be excluded.

The estimator 5 estimates magnitudes of third components of the first and second fields Uz and Vz in a third direction. The criterion-dependent iteration further comprises for example at least one criterion defining at least one threshold value for at least one term comprising at least one third component, in equations:

$$|Uz|\text{estimated} < \epsilon_6 \, \& \, |Vz|\text{estimated} < \epsilon_7 \text{(rectangular two dimensional criterion)}$$

$$|Uz|\text{estimated} \cdot |Vz|\text{estimated} < \epsilon_8^2 \text{(hyperbolic two dimensional criterion)}$$

$$|Uz|\text{estimated} \cdot |Vz|\text{estimated} < \epsilon_9^2 \, \& \, |Uz|\text{estimated} < \epsilon_{10} \, \& \, |Vz|\text{estimated} < \epsilon_{11} \text{(topped-off hyperbolic two dimensional criterion)}$$

Further criteria are not to be excluded.

The magnitudes of the third components of the first and second fields |Uz|estimated-1 and |Vz|estimated-1 are for example related to, for the first field, a square root of a first difference between the old magnitude squared of this first field and a sum of the first component squared and the second component squared of this first field in case this first difference is larger than zero for this first field or to zero for this first field in case this first difference is equal to or smaller than zero for this first field and to, for the second field, a square root of a second difference between the old magnitude squared of this second field and a sum of the first component squared and the second component squared of this second field in case this second difference is larger than zero for this second field or to zero for this second field in case this second difference is equal to or smaller than zero for this second field, in equations:

$$|Uz|\text{estimated} - 1 = (|U|\text{old}^2 - Ux^2 - Uy^2)^{\frac{1}{2}}$$
$$\text{if } |U|\text{old}^2 - Ux^2 - Uy^2 > 0$$
$$= 0 \text{ elsewhere}$$

$$|Vz|\text{estimated} - 1 = (|V|\text{old}^2 - Vx^2 - Vy^2)^{\frac{1}{2}}$$
$$\text{if } |V|\text{old}^2 - Vx^2 - Vy^2 > 0$$
$$= 0 \text{ elsewhere}$$

Alternatively, the magnitudes of the third components of the first and second fields |Uz|estimated-2,3 and |Vz|estimated-2,3 are for example related to, for one of the fields, a square root of a difference between the old magnitude squared of this one field and a sum of the first component squared and the second component squared of this one field in case this difference is larger than zero for this one field or to zero for this one field in case this difference is equal to or smaller than zero for this one field and to, for the other field, a magnitude of a further difference between the old dot product and a sum of a first product of the first components of the first and second fields and a second product the second components of the first and second fields, which further difference is divided by a magnitude of the third component of the one field, in equations:

$$|Uz|\text{estimated} - 2 = (|U|\text{old}^2 - Ux^2 - Uy^2)^{\frac{1}{2}}$$
$$\text{if } |U|\text{old}^2 - Ux^2 - Uy^2 > 0$$
$$= 0 \text{ elsewhere}$$

$$|Vz|\text{estimated} - 2 = |(U \cdot V - UxVx - UyVy)|/|Uz|$$
$$|Uz|\text{estimated} - 3 = |(U \cdot V - UxVx - UyVy)|/|Vz|$$

$$|Vz|\text{estimated} - 3 = (|V|\text{old}^2 - Vx^2 - Vy^2)^{\frac{1}{2}}$$
$$\text{if } |V|\text{old}^2 - Vx^2 - Vy^2 > 0$$
$$= 0 \text{ elsewhere}$$

In view of FIG. 2, the first sensor 9 supplies a signal Ux via the coupling 11 and a signal Uy via the coupling 12. The second sensor 10 supplies a signal Vx via the coupling 14 and a signal Vy via the coupling 15. The updater 4 updates |U| and |V| and (U·V) iteratively as long as the selected criteria are fulfilled. The estimator 5 estimates |Uz|estimated and |Vz|estimated and informs the updater 4 and supplies a signal Ux via the coupling 21, a signal Uy via the coupling 22, a signal |Uz|estimated via the coupling 23, a signal Vx via the coupling 24, a signal Vy via the coupling 25 and a signal |Vz|estimated via the coupling 26. Alternatively, starting values of |Uz|estimated and |Vz|estimated are not to be estimated but are to be downloaded or are to be entered by hand by a user.

In case of using |Uz|estimated–1 and |Vz|estimated–1, a proper convergence may not necessarily occur, and these estimations are therefore only to be used in a rare situation, for example for checking consistency. |Uz|estimated–2,3 and |Vz|estimated–2,3 show a proper convergence for two dimensional criteria such as hyperbolic and topped-off hyperbolic criteria, for rectangular two dimensional criteria their convergence might be questionable. The estimator 5 may have several options available and the updater 4 may comprise a detector not shown here for detecting a convergence and may comprise a selector not shown here for in response to a detection selecting one or more options. Alternatively, two or more options are used in parallel, and the updater 4 comprises a comparator for comparing results of the options with each other and/or with stored data and comprises a selector for in response to a comparison selecting one of the two or more options or selecting two of the three or more options etc. Further alternatively, several options are used in parallel, and the updater 4 comprises a weighting unit for weighting the results of the options. Such a detector, such a selector, such a comparator and such a weighting unit may alternatively form part of the estimator 5 or of the processor 6.

The first and second (vector) fields U and V might correspond with an earth gravitational field g and an earth magnetic field B or vice versa. Alternatively, one of the first and second (vector) fields U and V might correspond with either the earth gravitational field g or the earth magnetic field B and the other one might correspond with an other magnetic or electric or further field for example made by a human. Further alternatively, both the first and second (vector) fields U and V might each correspond with an other magnetic or electric or further field for example made by a human. The field information for the first and second fields is for example separately or combinedly used in the controller 3 and/or is for example separately or combinedly displayed via a display coupled to or forming part of the mmi 7a.

The first sensor 8,9 and the second sensor 10 are for example biaxial sensors for each providing field information defining a part of a field through for example respective first and second components in respective first and second directions. Alternatively, one of the sensors 8-10 can be a triaxial sensor for providing field information defining an entire field through for example respective first and second and third components in respective first and second and third directions. Further alternatively, only one sensor might be used for providing field information about two (or more) fields. This is for example possible in case the fields are of the same physical nature but distinguishable by being coded, multiplexed in time and/or multiplexed in frequency etc. Finally, a third sensor etc. and a third field etc. are not to be excluded. In that case, the invention will provide first and second and third etc. field information defining at least parts of first and second and third etc. fields and will update at least a parameter of at least one of the first and second and third fields via at least one criterion-dependent iteration etc.

The fact that at least one of the sensors 8-10 does not need to be a triaxial sensor but can be a biaxial sensor is a great advantage, owing to the fact that biaxial sensors can be produced easier and at lower costs and can be more durable and of a smaller size. However, the invention is not limited to at least one of the sensors 8-10 being a biaxial sensor but can also be used for improving the performance of triaxial sensors.

Instead of using a first and second and third components of a field in first and second and third directions, field information about this field might be defined in a different way, for example by using a magnitude and two angles of this field (one angle with respect to one plane and one other angle with respect to one other plane) etc. Even then, the invention still updates at least a parameter of at least one of fields via at least one criterion-dependent iteration etc.

The updater 4 might be 100% hardware and comprise an updating circuit, might be 100% software and comprise an updating module, and might be a mix of both. Independently of its realization, the updater 4 may form part of the processor 6, partly or entirely. The estimator 5 might be 100% hardware and comprise an estimating circuit, might be 100% software and comprise an estimating module, and might be a mix of both. Independently of its realization, the estimator 5 may form part of the processor 6, partly or entirely. The updater 4 and the estimator 5 may be combined partly or may be combined entirely into one circuit or module.

Instead of updating the dot product (U·V), alternatively a normalized dot product can be updated (U·V)/(|U||V|), to separate magnitude changes and angle changes.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware or by the same module of software. The mere fact that certain measures are recited in mutually different dependent claims does not indicate that a combination of these measures cannot be used to advantage.

The invention claimed is:

1. A device comprising;
   a sensor arrangement for providing first field information defining at least a part of a first field, the part of the first field comprising respective first and second components of the first field in respective first and second directions and a third component of the first field in a third direction, and for providing second field information defining at least a part of a second field, the part of the second field comprising respective first and second components of the second field in respective first and second directions, and
   an updater for updating at least a parameter of at least one of the first and second fields via at least one criterion-dependent iteration, the parameter comprising a magnitude of at least one of the first and second fields and a dot product of the first and second fields, the criterion-dependent iteration comprising a magnitude function and a dot product function,
   wherein the magnitude function defining a new magnitude of the second field being a function of an old magnitude of the second field and of an updated magnitude of the second field and the dot product function defining a new dot product of the first and second fields being a function of an old dot product of the first and second fields and of an updated dot product of the first and second fields.

2. The device as defined in claim 1, the device further comprising:
   an estimator for estimating a third component of the second field in a third direction, the criterion-dependent iteration further comprising at least one criterion defining at least one threshold value for at least one term comprising at least one third component.

3. The device as defined in claim 2, a magnitude of the third component of the second field being related:
   either to a square root of a difference between the old magnitude squared of the second field and a sum of the first component squared and the second component squared of the second field in case this difference is larger than zero or to zero in case this difference is equal to or smaller than zero,
   or to a magnitude of a further difference between the old dot product and a sum of a first product of the first components of the first and second fields and a second product of the second components of the first and second fields, which further difference is divided by a magnitude of the third component of the first field.

4. The device as defined in claim 1, the criterion-dependent iteration comprising a first magnitude function and a second magnitude function and a dot product function.

5. A device comprising:
   a sensor arrangement for providing first field information defining at least a part of a first field and for providing second field information defining at least a part of a second field, and
   an updater for updating at least a parameter of at least one of the first and second fields via at least one criterion-dependent iteration, the criterion-dependent iteration comprising a first magnitude function and a second magnitude function and a dot product function,
   wherein the first magnitude function defines a new first magnitude of the first field being a function of an old first magnitude of the first field and of an updated first magnitude of the first field and the second magnitude function defines a new second magnitude of the second field being a function of an old second magnitude of the second field and of an updated second magnitude of the second field and the dot product function defining a new dot product of the first and second fields being a function of an old dot product of the first and second fields and of an updated dot product of the first and second fields.

6. The device as defined in claim 5, the device further comprising: an estimator for estimating third components of the first and second fields in third directions, the criterion-dependent iteration further comprising at least one criterion defining at least one threshold value for at least one term comprising at least one third component.

7. The device as defined in claim 6, magnitudes of the third components of the first and second fields being related:
   either to, for the first field, a square root of a first difference between the old magnitude squared of this first field and a sum of the first component squared and the second component squared of this first field in case this first difference is larger than zero for this first field or to zero for this first field in case this first difference is equal to or smaller than zero for this first field and to, for the second field, a square root of a second difference between the old magnitude squared of this second field and a sum of the first component squared and the second component squared of this second field in case this second difference is larger than zero for this second field or to zero for this second field in case this second difference is equal to or smaller than zero for this second field,
   or to, for one of the fields, a square root of a difference between the old magnitude squared of this one field and a sum of the first component squared and the second component squared of this one field in case this difference is larger than zero for this one field or to zero for this one field in case this difference is equal to or smaller than zero for this one field and to, for the other field, a magnitude of a further difference between the old dot product and a sum of a first product of the first components of the first and second fields and a second product the second components of the first and second fields, which further difference is divided by a magnitude of the third component of the one field.

* * * * *